United States Patent [19]

Schiele

[11] Patent Number: 5,071,185
[45] Date of Patent: Dec. 10, 1991

[54] TRUCK BED ENCLOSURE

[76] Inventor: Jim D. Schiele, P.O. Box 1260, Springfield, Oreg. 97477

[21] Appl. No.: 643,211

[22] Filed: Jan. 22, 1991

Related U.S. Application Data

[63] Continuation-in-part of Ser. No. 471,406, Jan. 29, 1990, abandoned.

[51] Int. Cl.⁵ .............................................. B60P 3/00
[52] U.S. Cl. ........................................ 296/3; 296/34; 296/36; 296/43; 16/261; 410/106; 410/121
[58] Field of Search .................. 296/3, 10, 32, 34, 36, 296/43; 105/355, 378, 380; 410/106, 110, 121, 153; 16/229, 261, 262; 256/59, 65, 67; 248/224.3

[56] References Cited

U.S. PATENT DOCUMENTS

| | | | |
|---|---|---|---|
| 2,080,764 | 5/1937 | Crawford | 296/10 |
| 2,947,566 | 8/1960 | Tower | 296/3 X |
| 4,703,969 | 11/1987 | Rayburn et al. | 296/3 |

FOREIGN PATENT DOCUMENTS

| | | | |
|---|---|---|---|
| 626079 | 8/1961 | Canada | 296/3 |
| 74703 | 6/1946 | Norway | 16/262 |

Primary Examiner—Margaret A. Focarino
Assistant Examiner—Andrew C. Pike
Attorney, Agent, or Firm—James D. Givnan, Jr.

[57] ABSTRACT

An enclosure for installation about the load carrying area of a truck with the enclosure includes removable corner posts for inserted engagement with truck structure. Enclosure side and end rails extend between the corner posts and are adapted for removable, rested engagement with the corner posts to permit convenient installation and removal of the rails. Multiple rows of sockets on each corner post receive pins carried at and offset from the ends of each rail member. The pins are horizontally adjustable relative to the rail member to facilitate socket engagement. A modified form of the enclosure includes corner post fittings of right angular shape each apertured for purposes of corner post attachment. Sockets on the post fittings receive the pins of rail carried fittings to enable part installation on the corner post in a detachable manner.

5 Claims, 2 Drawing Sheets

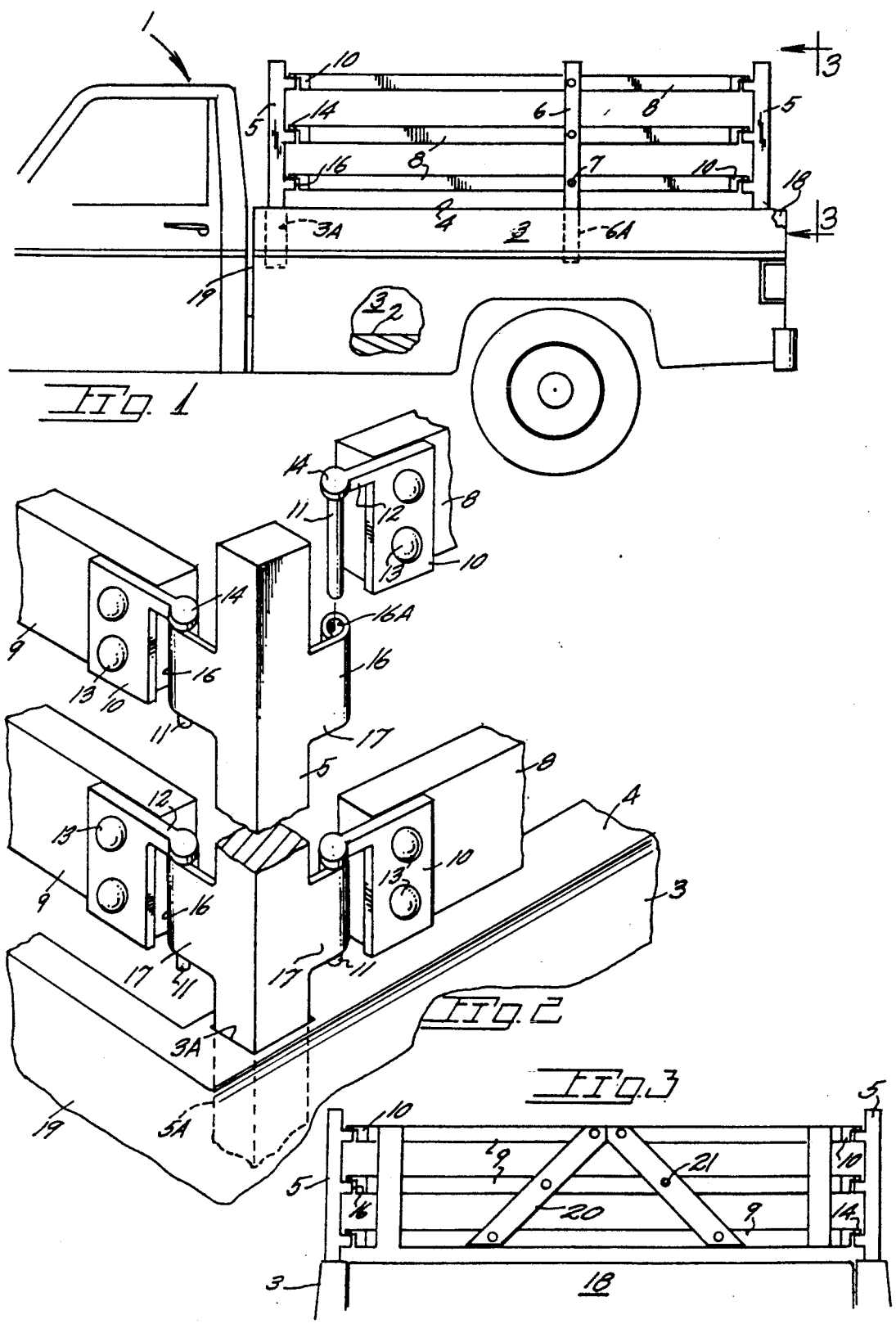

TRUCK BED ENCLOSURE

The present application is a continuation-in-part of my earlier copending application of the same title filed Jan. 29, 1990, under Ser. No. 07/471,406, now abandoned.

BACKGROUND OF THE INVENTION

The present invention pertains generally to a temporary enclosure for assembly in place about the load carrying area of a truck.

The safe transport of bulky loads is best accomplished using a temporary or supplemental enclosure. On pickup trucks such enclosures, to the extent known, do not lend themselves to convenient disassembly and removal. Considerable effort is involved in at least partial disassembly of the enclosure involving the removal of fastener assemblies joining the post and rail members of the enclosure. Further, known load enclosures for increasing the load confining area of a truck are typically of costly construction custom built by truck equipment manufacturers.

U.S. Pat. No. 3,365,230 is of interest for it discloses pins and sockets for coupling a tailgate directly to rail members of a truck bed enclosure.

U.S. Pat. No. 2,080,764 discloses a truck enclosure wherein rails are joined by cooperating fittings on the rail ends with the leg member of a canopy supporting bow which extends through one fitting of each pair. U.S. Pat. No. 2,947,566 discloses the use of right angular pins to interconnect horizontal rack members in a pick-up truck box. U.S. Pat. No. 3,252,730 shows the use of pins and socket numbers to join the side and rear members of a removable truck bed enclosure. U.S. Pat. No. 3,986,317 shows the use of interengageable connectors to brace the uppermost rails of a truck bed enclosure.

SUMMARY OF THE PRESENT INVENTION

The present invention is embodied within an enclosure for installation about the load receiving area of a truck with post and rail members being in rested engagement with one another in a manner preventing accidental separation.

The corner post structures and enclosure rail members include pin and socket components. Each corner post is adapted to receive the ends of both longitudinal as well as transversely disposed enclosure rail members. A lower end segment of each corner post is of a section permitting insertion into a receptacle defined by truck structure. If so desired, the enclosure rail members may be of wood with the ends of same having fittings embodying part of the cooperating pin and socket means. Each corner post is capable of supporting the ends of several side and crosswise disposed enclosure members to provide an enclosure of suitable height. Preferably the enclosure members are of lightweight material, such as wood, to permit both installation and removal by one person.

A modified form of the present enclosure utilizes corner brackets for attachment to the corner posts in place in receptacles provided by truck box structure. The corner brackets cooperate with rail mounted fittings to enable the side and end rails of an enclosure to be both readily installed and removed.

Important objectives include the provision of an enclosure for the load carrying area of a truck with the enclosure having corner posts and elongate rail members with the latter being in rested engagement with the corner posts; the provision of an enclosure for a load carrying area of a truck and having corner posts and rail members jointly supporting pin and socket means for retention of the rail members in place on the posts; the provision of an enclosure for the load carrying area of a truck with the enclosure being capable of convenient disassembly for stowage within a small area such as along the side of a one car garage; the provision of an enclosure for convenient installation on a truck by reason of novel pin and socket connectors attached to the side rail member and the end rail members which may be of low cost material resulting in an enclosure lending itself to assembly by the vehicle owner.

BRIEF DESCRIPTION OF THE DRAWINGS

In the accompanying drawings:

FIG. 1 is a side elevational view of a truck equipped with the present enclosure;

FIG. 2 is a fragmentary perspective view of a corner post and associated rail member ends;

FIG. 3 is an end elevational view taken along line 3—3 of FIG. 1; and

DETAILED DESCRIPTION OF THE PREFERRED EMBODIMENTS

Figure 4:
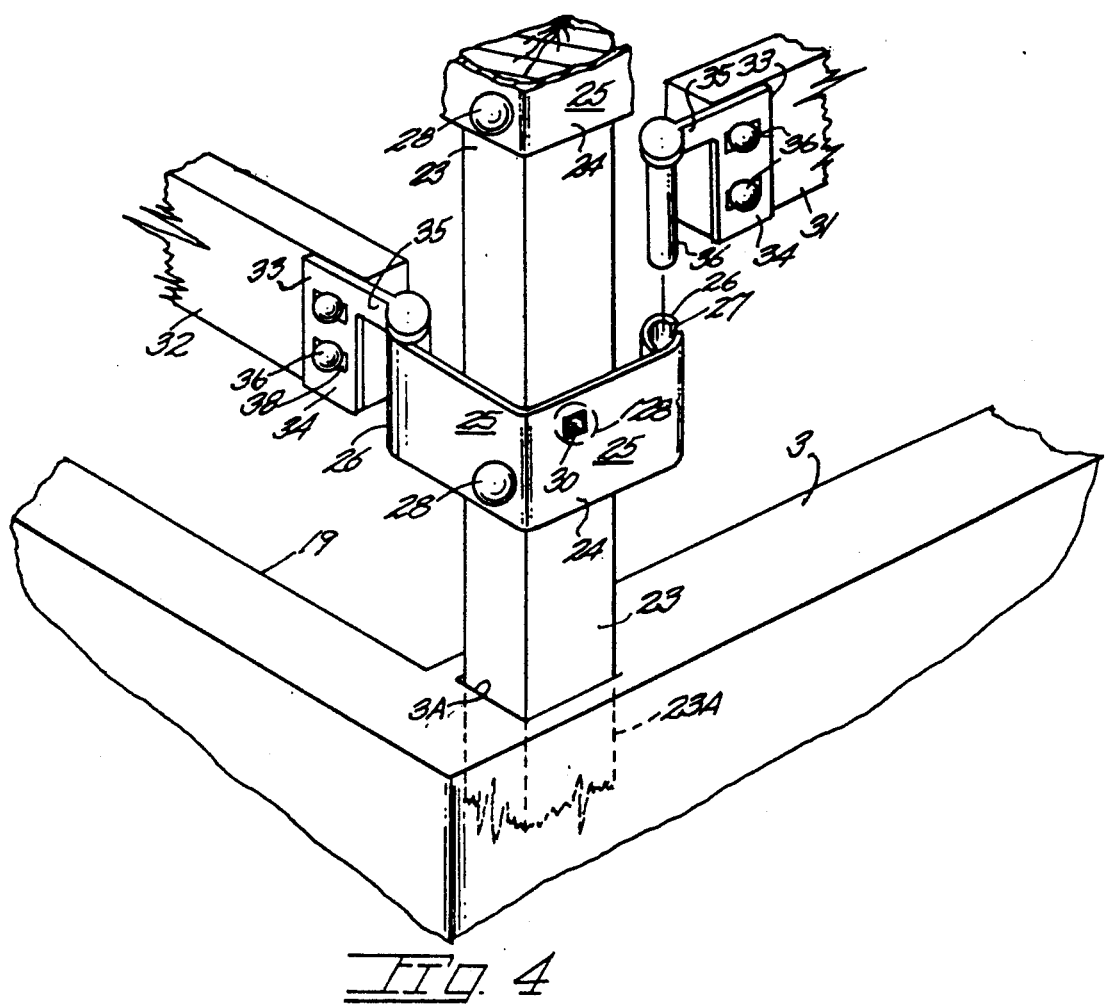
FIG. 4 is a view similar to FIG. 2 but showing a modified form of the enclosure.

With continuing attention to the drawings wherein applied reference numerals indicate parts similarly hereinafter identified, the reference numeral 1 indicates generally a truck which may be of the pickup type having a load receiving area bed at 2.

A pair of truck box sidewalls are at 3 and typically define corner located receptacles at 3A extending downwardly from the box edge at 4.

The present enclosure includes corner posts at 5 at the truck box corners with each post having a lower end segment 5A for inserted engagement with a receptacle as at 3A. Supplemental posts as at 6 may be utilized at points along the truck box sides with post lower end segments as at 6A for insertion into additional receptacles formed in the truck box side walls. Removable fasteners 7 join the posts 6 to the later described side rail members.

Each corner post 5 is of a cross sectional shape and size to fit snugly into a side wall receptacle 3A. Side rail members 8 extend between the corner posts and may be of different lengths, as for example, additional or end rail members at 9 for disposition crosswise at the front and rear ends of the enclosure.

Removably attaching the rail members 8 and 9 to the corner posts are pin and socket means which enable rail member detachment by lifting of same during enclosure disassembly. A fitting on the end segment of each rail member includes a plate 10 on which a pin 11 is carried in an offset manner by an arm 12 of the fitting. Plate attaching fasteners at 13 may be carriage bolts provided with a washer and nut at their unseen end. A head at 14 on the pin limits downward entry of pin 11 into socket means at 16 having an inner wall surface 16A defining the pin receiving socket. A web at 17 of the socket means is integral with the post proper. While the pin and socket are shown as being of circular section, it will be understood that pin and socket sections may vary, as for example, they may be of polygonal section.

The front and rear rail members 9 which extend transversely across the truck box above the forward end 19 of the truck box and above a truck box tailgate at 18 may be reinforced by braces at 20 and fastener assemblies 21 extending through same and the rail members.

The socket means 16 are preferably arranged on each corner post 5 in multiple vertical rows offset from one another and offset from the corner post by the web 17 of the socket means.

To permit adapting of the present enclosure to a specific truck, the plates 10 may be provided with horizontally elongate openings for receiving fasteners 13 in an adjustable manner. The use of relatively low cost, wooden rail members permits the enclosure to be modified for use on other trucks subsequently acquired by the user. While the term rail members is used in the foregoing description, it is to be understood that the same encompasses an elongate panel extending intermediate and oppositely corner posts and serving to confine a load.

In FIG. 4 a modified form of enclosure is shown wherein a corner post 23 has a lower end segment 23A in place within a truck box defined receptacle 3A. In place on corner post 23 are corner brackets 24 each having right angularly disposed flanges 25 for abutment with contiguous sides of the post. Each flange terminates in a sleeve 26. A slot at 27 extends part way down the sleeve as later explained. The corner brackets 24 on each corner post are installed in place by carriage bolt assemblies 28 which extend through vertically offset openings as at 30 in bracket flanges 25 in a vertically spaced or staggered manner providing bolt spacing. A side rail at 31 is typical of the remaining side rails of the enclosure as is an end rail 32 above the forward end of the truck box 3. Both ends of the end rails and side rails are provided with end mounted fittings as at 33 including a plate 34, an arm 35 and a pin 36 for insertion into the sleeve 26 of a corner bracket. The arm 35 may be inset within sleeve defined slot 27. Fasteners at 36 attach the end mounted fittings to the rail ends. To facilitate installation of the rail members in place between corner posts the end mounted fittings may include elongate openings 38 for fastener reception to permit a horizontal adjustment of pins 36. Supplemental posts for the side rails may be used with the modified enclosure such as the posts indicated at 6 in the first described form of the invention.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. In an enclosure having elongate members for a cargo carrying area of truck, the improvement comprising:

corner posts for insertion into receptacles defined by truck structure, each of said posts having vertically spaced apart pairs of webs integral with and projecting outwardly from said posts, a socket formed at a distal end of each of said webs, and fittings for attachment one each to each of the ends of the elongate members of the enclosure, each of said fittings including a pin for socket engagement for retention of said elongate members on said corner posts.

2. The improvement claimed in claim 1 wherein each of said fittings includes an arm to offset the pin of the fitting from the adjacent end of one of said elongate members.

3. In a knockdown enclosure for a cargo carrying area of a truck having corner posts and horizontal side rails, and end rails the improvement comprising:

corner post fittings having right angularly disposed flanges, each of said flanges terminating in an upright socket, rail fittings one each for attachment to each of the ends of said side and end rails and each including a pin for insertion into one of said sockets for supporting the side and end rails on said posts in a detachable manner, and each of said corner post fittings defining apertures to receive fastening means engageable with the respective corner post.

4. The improvement to the knockdown enclosure claimed in claim 3 wherein said apertures defined by one of said corner post fittings are vertically offset from one another for fastener separation.

5. The improvement to the knockdown enclosure claimed in claim 3 wherein said rail fittings each defines horizontally elongate openings for fastener reception to permit horizontal adjustment of the rail fittings on the side and the end rails.

* * * * *